United States Patent [19]
Sapinski

[11] 3,854,370
[45] Dec. 17, 1974

[54] TRAINING AID FOR STRINGED MUSICAL INSTRUMENT

[76] Inventor: Stanley Sapinski, 1716 E. Wesleyan Dr., Tempe, Ariz. 85282

[22] Filed: May 1, 1974

[21] Appl. No.: 465,728

[52] U.S. Cl. ................................. 84/485, 84/293
[51] Int. Cl. ............................................ G10b 15/00
[58] Field of Search ............. 84/293, 470, 471, 477, 84/485

[56] References Cited
UNITED STATES PATENTS

| | | | |
|---|---|---|---|
| 1,324,274 | 12/1919 | Schantz | 84/477 R |
| 3,153,970 | 10/1964 | Mulchi | 84/485 |
| 3,218,904 | 11/1965 | Hartman | 84/485 |
| 3,403,591 | 10/1968 | Weitzner | 84/485 |

FOREIGN PATENTS OR APPLICATIONS

| | | | |
|---|---|---|---|
| 1,325,933 | 3/1963 | France | 84/485 |
| 1,428,567 | 1/1966 | France | 84/485 |

Primary Examiner—Richard B. Wilkinson
Assistant Examiner—John F. Gonzales
Attorney, Agent, or Firm—William H. Drummond; Gregory J. Nelson; Don J. Flickinger

[57] ABSTRACT

A fingerboard having a light transmitting substrate is spaced from the neck of a guitar or similar musical instrument. A plate, having a finger placement pattern thereon, is received in the space between the neck and the fingerboard. In one embodiment, the plate is opaque and the pattern comprises light transmitting areas. Light is transmitted from a source within the neck through the light transmitting areas to the fingerboard. According to an alternate embodiment, the light source is integral with the plate. Several plates are provided, each having a designated finger placement pattern thereon.

1 Claim, 4 Drawing Figures

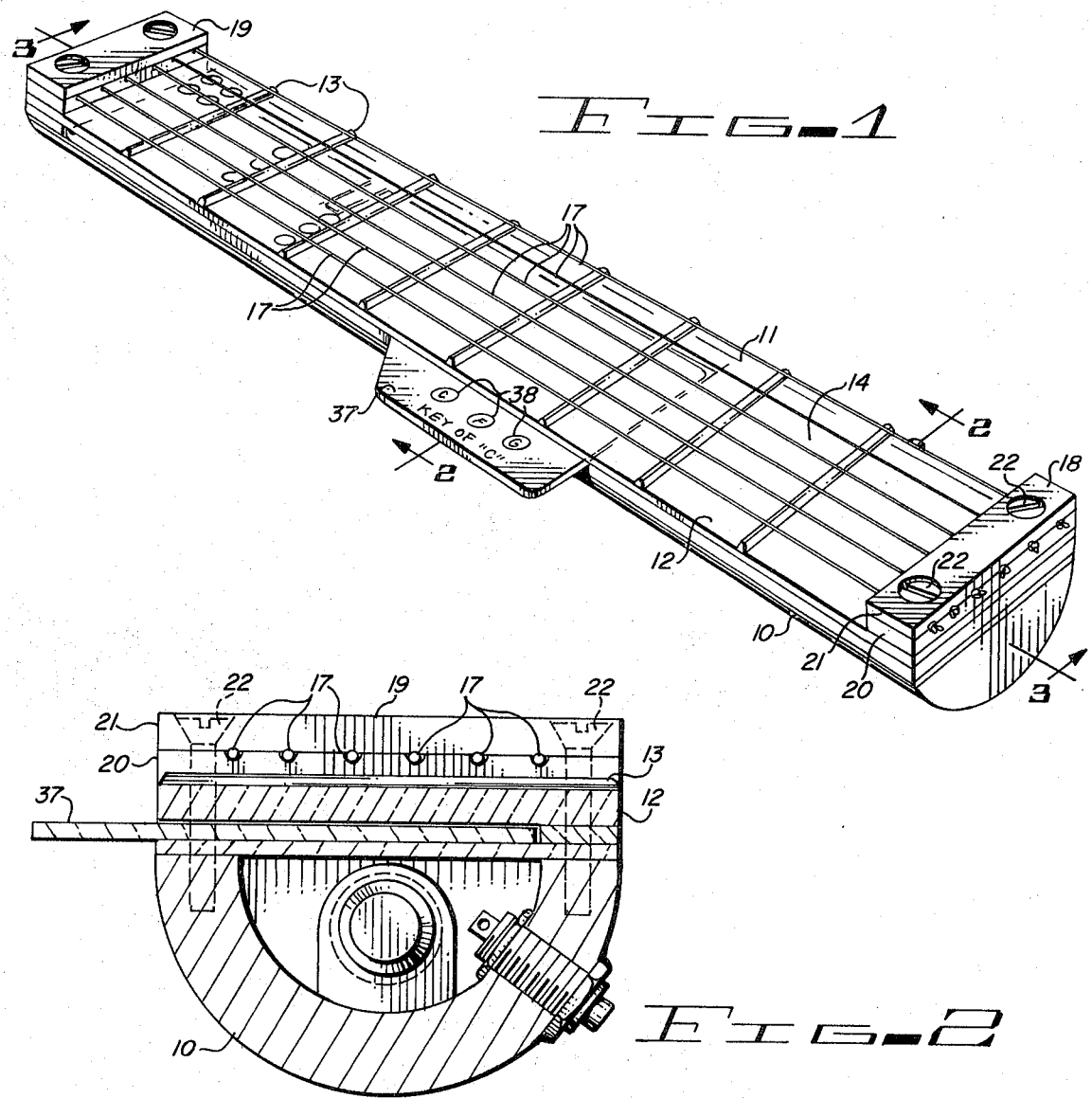
FIG-1
FIG-2
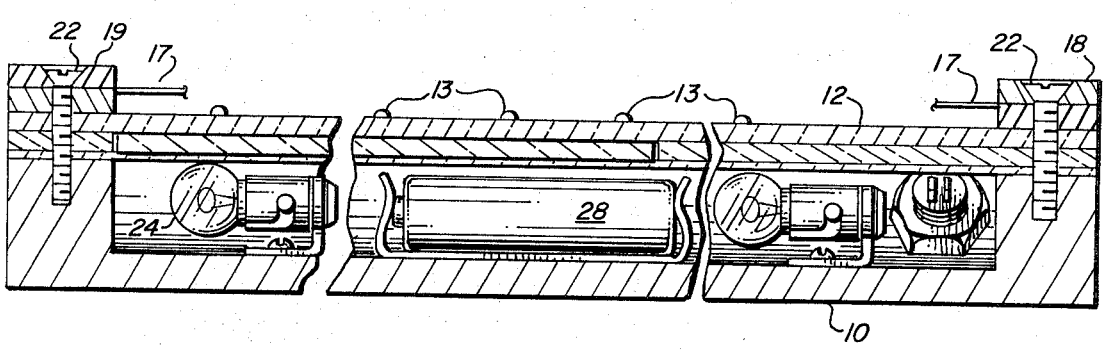
FIG-3

TRAINING AID FOR STRINGED MUSICAL INSTRUMENT

This invention relates to musical instruments.

More particularly, the invention relates to musical instruments of the type having a neck and fingerboard thereon, such as guitars, ukuleles and mandolins.

In a further aspect, the instant invention concerns a training aid to designate finger placement for selected chords in connection with stringed and fretted musical instruments.

Guitars, banjos, ukuleles and similar musical instruments basically comprise a soundbox and a neck extending therefrom. A plurality of raised transverse ridges, commonly called frets, are spaced along the front face of the neck. Spaced strings are stretched over the soundbox and extend along the neck over the frets. The area of the neck having frets and strings is designated the fingerboard. When playing the instrument, the musician fingers the chords on the fingerboard with one hand, while manipulating the strings in the area of the soundbox with the other hand.

Learning the various chords and the finger placement associated therewith is an effortful endeavor requiring extended practice. The prior art is replete with devices which purport to reduce the effort and time required before a novice can begin playing music. Generally, these devices include a series of cards, each of which is detachably securable to the keyboard of the instrument. The card has an arrangement of dots thereon which correspond to the finger placement for a designated chord. Some of the cards are used only with specially contrived practice fingerboards, while others are adapted for use with the actual instrument.

The foregoing training aids or chord finders do provide and assist the aspiring musician by indicating finger placement. However, the prior art devices do not adequately satisfy the need for which they were devised. As the guitar, or other similar instrument, is usually held, the fingerboard is directed away from the body. Even when the player holds his head in the most advantageous position, the face of the keyboard is at a very acute angle to the line of vision. To alleviate the situation and adequately view any indicia upon the keyboard, it is necessary that the player hold the instrument in an unnatural and an awkward position. The difficulty of viewing the keyboard is further increased by the conditions under which such instruments are usually played. It is generally well known that musicians have a penchant for playing in subdued light.

Accordingly, it is a principal object of the present invention to provide an improved training aid for players of stringed instruments including guitars, banjos and ukuleles.

Another object of the present invention is to provide a training aid to more readily indicate finger placement upon the fingerboard of the instrument in accordance with selected chords.

Still another object of the present invention is to provide a training aid in which the indicated finger positions are readily visible when the player holds the instrument in the natural position.

Yet another object of the present invention is the provision of a training aid which will afford the musician the ability to practice regardless of ambient light conditions.

A further object of the present invention is to provide a training aid in which the indicated finger positions are quickly and conveniently changed in accordance with the selected chord the player desires to practice.

Still a further object of the present invention is to provide a training aid of the character abovedescribed which is adapted to be manufactured as a training instrument neck, or can be incorporated into an actual instrument.

Briefly, to achieve the desired objectives of the present invention in accordance with a preferred embodiment thereof, first provided is a fingerboard having an elongate light transmitting substrate which is held in a spaced relationship to the instrument neck. It is understood that the term "neck" as used herein is either the neck of the actual musical instrument or a dummy practice neck which may or may not be fitted with a practice music box. A plurality of transverse frets are spaced upon the outer surface of the substrate, over which are stretched the several strings in accordance with the particular musical instrument. A series of opaque plates are sized to be insertable between the neck and the fingerboard. A slot within the plate registers with a projection affixed to the neck to locate the plate and insure alignment with the frets and strings.

Each opaque plate has one or several light transmitting areas therein corresponding to a particular note or chord, respectively, and bears identifying indicia designating that note or chord. Alternately, a single plate may accommodate the several chords of a given key. Each chord is denoted by a different color and the various light transmitting finger placement designated areas are colored accordingly. Light generated by a source within the neck passes through the various light transmitting areas of the opaque plate at appropriate spots upon the substrate of the fingerboard. The various lighted spots upon the substrate are readily seen by the player and the player simply uses his fingers to blot out the appropriate spots.

In an alternate embodiment, the plate carries light sources arranged according to selected finger placements. The light sources, preferably miniature lamps, receive energy from a stored source within the neck. It is also within the scope of the invention to incorporate a miniaturized circuit including lamps and energy cell within each plate.

The stated and further and more specific objects and advantages of the present invention will become readily apparent to those skilled in the art from the following detailed description of a preferred embodiment thereof, taken in conjunction with the drawings, in which:

FIG. 1 is a perspective view of a practice neck for a stringed instrument and embodying a training aid, in accordance with the teachings of the present invention;

FIG. 2 is a vertical sectional view taken along the line 2—2 of FIG. 1;

FIG. 3 is a vertical sectional view taken along the line 3—3 of FIG. 1; and

Figure 4:
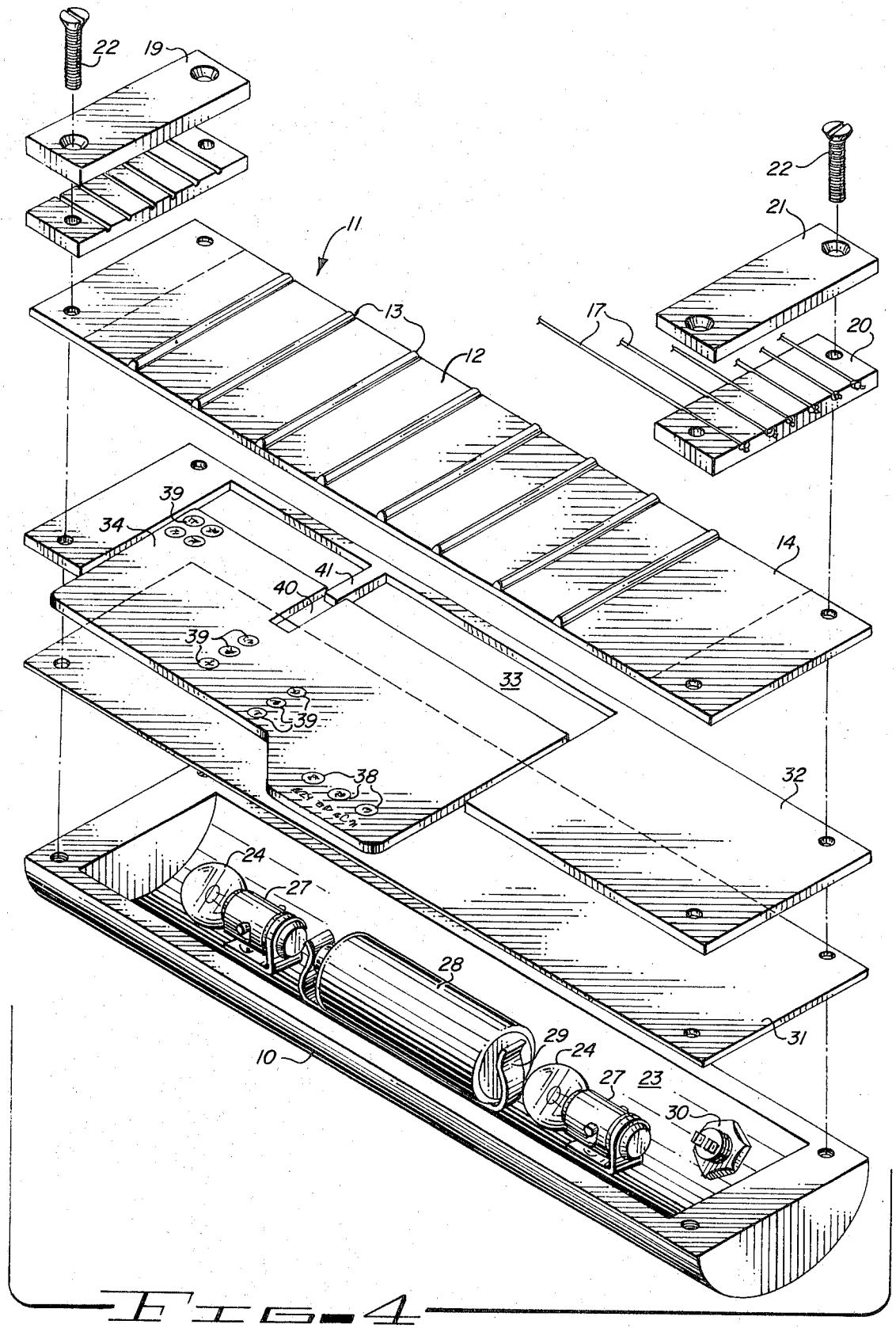
FIG. 4 is an exploded perspective view of the device of FIG. 1.

Turning now to the drawings, in which the same reference characters indicate corresponding elements throughout the several views, attention is first directed to FIG. 1, which illustrates a typical stringed instrument neck, generally designated by the reference character 10, As herein illustrated, the neck 10 forms the base of a practice instrument which supports a fingerboard, generally designated by the reference character 11, having an elongate transparent substrate 12. A plurality of transverse frets 13 are spaced along the upper surface 14 of the substrate 12. A plurality of strings 17 are stretched over the frets and are retained at either end of the neck 10 by bridges 18 and 19, respectively. Each bridge 18 and 19 has a lower clamp member 20 and an upper clamp member 21 between which the strings 17 pass. Screws 22 extend through the first and second clamp members 20 and 21, respectively, to clamp the strings 17 therebetween and threadedly engage the neck 10 to securely affix the bridge 18.

As better illustrated in FIGS. 2, 3 and 4, the neck 10 has a cavity 23 therein. A conventional light source is housed within the cavity 23. The light source includes miniature lamps 24 held by sockets 27, a battery 28 encased in battery holder 29, and a switch 30. The necessary wiring has been omitted for purposes of clarity of illustration. A cover 31, substantially the width and length of the neck 10, closes the cavity 23. The cover 31 is transparent and preferably frosted on one surface thereof to transmit diffused light and avoid high intensity areas adjacent the lamps 24.

The substrate 12 is spaced from the cover 31 by an intermediate plate 32. The bridges 18 and 19, the substrate 12, the intermediate plate 32, and the cover 31 are secured to the neck 10 by the screws 22. The intermediate plate 32 is opaque and has a portion thereof cut out to define a receptacle 33. An opaque plate 34 is sized and shaped to be closely received within the receptacle 33. The opaque plate 34 is the chord indicator card and bears primary indicia 37 indicating the key and secondary indicia 38 indicating the chord within that key. As illustrated herein, the primary indicia 37 reads "Key of C," while the secondary indicia 38 consists of three dots which are imprinted, respectively, C, F and G. Each dot of the secondary or "chord" identifying indicia has a unique color. Light transmitting areas 39 extend through the plate 34. Each light transmitting area is colored in accordance with one of the designated chords. Light passing through the various light transmitting areas 39 from within the cavity 23 projects a series of colored dots upon the transparent substrate 12 of the fingerboard 11. The arrangement of dots of a particular color designates the finger placement for the designated chord. It is noted that the plate 34 has an offset slot 40 which registers with tap 41 to prevent accidental upside-down insertion of the plate 34 into the cavity 33.

From the foregoing description of the preferred embodiment of the present invention, it will be immediately apparent to those skilled in the art that the teachings thereof may be used to modify an actual musical instrument in addition to the practice instrument, as herein specifically illustrated in the drawings. It is also apparent that the structure is adaptable to banjos, guitars, ukuleles, or other stringed instruments which include a neck and fingerboard. In accordance with a preferred embodiment of the invention, various chord indicator cards are provided, each including the various chords of a particular key. However, for the beginning player, cards may be provided which indicate the finger positions of a single note or chord.

Having fully described and disclosed the present invention and the preferred embodiment thereof in such clear and concise terms as to enable those skilled in the art to understand and practice the same, the invention claimed is:

1. A training aid for stringed instruments of the type having a neck and fingerboard, including guitars and mandolins, for assisting the player thereof in the proper placement of fingers on the fingerboard, said training aid comprising in combination:
   a. a stringed instrument neck;
   b. a fingerboard carried by said neck including
      i. an elongate light transmitting substrate spaced from said neck,
      ii. a plurality of spaced transverse frets upon the outer surface of said substrate, and
      iii. a plurality of spaced strings extending longitudinally of said substrate over said frets;
   c. a fingering indicator including
      i. a plate insertable between said neck and said substrate carrying illuminatable indicia corresponding to a preselected fingering pattern;
   d. means for illuminating said indicia, and
   e. locating and retaining means for registering said chord indicator with said fingerboard.

* * * * *